Feb. 10, 1925.

L. O. FRENCH 1,525,776

INTERNAL COMBUSTION ENGINE

Filed Aug. 28, 1922

INVENTOR
Louis O. French

Patented Feb. 10, 1925.

1,525,776

UNITED STATES PATENT OFFICE.

LOUIS O. FRENCH, OF MILWAUKEE, WISCONSIN.

INTERNAL-COMBUSTION ENGINE.

Application filed August 28, 1922. Serial No. 584,687.

*To all whom it may concern:*

Be it known that I, LOUIS O. FRENCH, a citizen of the United States, and resident of Milwaukee, in the county of Milwaukee and State of Wisconsin, have invented new and useful Improvements in Internal-Combustion Engines, of which the following is a description, reference being had to the accompanying drawings, which are a part of this specification.

The invention relates to internal combustion engines and more particularly to those using liquid fuel.

For efficient and proper operation the liquid fuel introduced into the engine should be thoroughly vaporized and mixed with the air for complete combustion during the working stroke. The object of this invention is to provide an engine in which the liquid fuel is vaporized and the gaseous fuel mixed with the air in the cylinder in an efficient manner and which, due to the mixing action, will operate efficiently through a wide range of load. More particularly the invention is designed to introduce a charge of more or less gasified liquid fuel into a stream of hot gas passing into the cylinder and mixing with the air therein so as to secure good combustion during the working stroke.

The invention further consists in the several features hereinafter set forth and more particularly defined by claims at the conclusion hereof.

Figure 1:
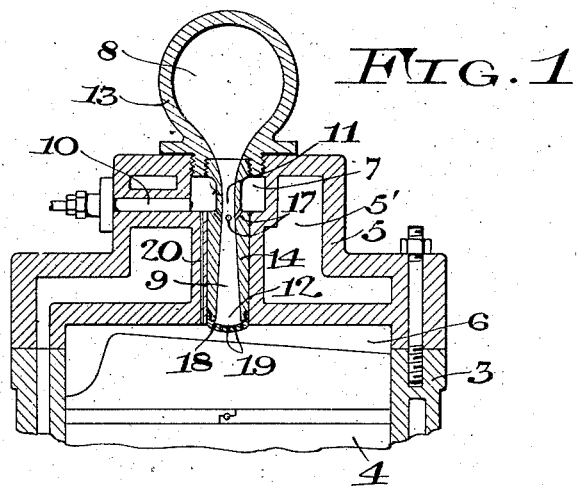
Figure 2:
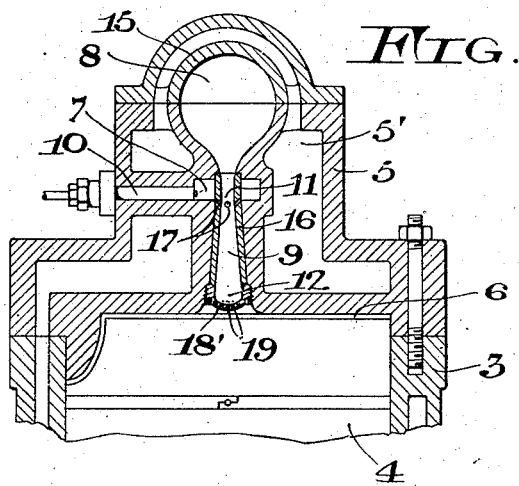

In the drawings: Fig. 1 is a detail sectional view through an engine embodying the invention; Fig. 2 is a view similar to Fig. 1 showing a modified arrangement.

In both figures of the drawing the numeral 3 designates the cylinder of the engine, 4 the piston working therein, 5 the cylinder head with water-jacket space 5', 6 the main combustion chamber, 7 a fuel-receiving chamber, 8 a gas chamber which may contain air or air mixed with inert or active gases, 9 a passage with which the chambers 7 and 8 communicate, and 10 a fuel-introducing means.

The chamber 8 discharges into the upper portion of the passage 9 which is preferably in the form of a Venturi tube or passage flaring outwardly from its throat portion 11 to its lower end 12. The cross-section at the throat portion 11 is relatively small compared to the total volume of the chamber 8 so that during the downward stroke of the piston gas from said chamber will flow into the chamber at a relatively high velocity. In Fig. 1 the chamber 8 and the passage 9 are formed by a removable bulb section 13 and a removable tube section 14, while in Fig. 2 the chamber 8 and passage 9 is formed by a part 15 of the cylinder head itself and a removable tube section 16.

The fuel-receiving chamber 7 is a vaporizing or precombustion chamber into which the fuel may be introduced by a spray nozzle 10 or other suitable means well known to the art. A part of the walls of the chamber 7, separating it from the chamber 8, is preferably defined by portions of the tube section 14 or 16 and these portions during the running of the engine will remain hotter than the outer walls so as to aid in supplying heat to the chamber, in addition to the heat of compression, and partly or wholly vaporize the fuel in the chamber 7, depending upon the heat furnished and the character of the fuel. The partly or wholly vaporized fuel is discharged in each instance into the passage 9 and preferably in the region of the throat 11 and in a direction toward the outer end 12 of the passage 9 in a restricted manner as in one or more fine streams through one or more relatively small holes 17. At the end of the passage 9, I preferably mount a nozzle member 18 or 18 provided with a plurality of small discharge openings 19, in order to secure a further mixing and throttling, and in some instances a more forcible introduction of the fuel-charged air into the air in the chamber 6. This nozzle member is not entirely necessary, yet it seems to improve the efficiency of the engine. In Fig. 1 the member 18 is shown as having a detachable threaded connection with the lower end of the tube section 14 which has a threaded connection with the bulb 13. In Fig. 2 this member 18' has a detachable threaded connection with the cylinder head and holds the tube 16 in place.

The construction shown in Fig. 1 is illustrative of a form suitable for engines using medium or low compression, that is, when the compression is not sufficient to cause auto-ignition when starting from cold. In this form starting may be effected in various ways, such as heating up the exposed bulb with a torch, using a suitable ignition device in the chamber 7, or chamber 8 or leaving a part of the exterior wall of the chamber 7 unjacketed and heating it.

The construction shown in Fig. 2 is illustrative of a form suitable for engines using high compresion, that is, where the compression pressure raises the air to a temperature sufficient for auto-ignition, where the water-jacket 5′ may extend completely around chamber 7 and wholly or partly around chamber 8. Provision may also be made for cooling the upper portion of the tube 16, if desired.

In either of the constructions above described, the passage 9 may be rifled to secure a whirling movement of the air and the openings 17 may be inclined to secure a whirling movement of the fuel, both of which expedients for producing a whirl or turbulence are well known to the art.

Assuming that the engine has been started and the air is of a temperature to produce auto-ignition in the form shown in Fig. 2, and that the bulb 13 and the upper exposed part of the tube section 14 of the form shown in Fig. 1 have become heated in case of fuel which does not vaporize readily, then in each instance during each cycle of operation air introduced into the combustion chamber, either by two or four cycle operation, is compressed on the up-stroke of the piston and some of the air passes to the chambers 8 and 7. At the proper time, which may depend upon the character of the fuel, the speed of the engine and the heat cycle adopted, fuel is introduced into the chamber 7 by the fuel-introducing means 10. The time of injection is preferably during the compression stroke, particularly where the heat of the chamber 7 and the compression temperature is such as to provide rapid vaporization though it may be earlier in the cycle with a high speed engine. As the piston moves out on its power stroke the fuel charge from the chamber 7 will be injected into the passage 9 and into the stream of air passing down from the chamber 8, partly by the pressure generated by the gases expanding in the chamber 7 and partly by reason of the suction effect of the piston, so that the fuel charge mixes with air or gas passing into the chamber 6 and is consumed. The time at which the fuel from the chamber 7 starts to enter the passage 9 may be regulated by the timing of the introduction of fuel into the chamber 7, and the rate of injection into said passage may be regulated by selection of the proper discharge area provided by the holes 17 and in this way combustion can be caused to take place practically at constant pressure or partly at constant volume and partly at constant pressure. If the latter heat cycle is used then some of the gaseous mixture may reach the chamber 8 or the combustion chamber 5 before the piston starts on the down stroke. Furthermore, the amount of gaseous fuel to the amount of air passing through the passage 9 may be determined by the rate of discharge from the chamber 7 and the cross-sectional area of the throat portion 11. A small passage 20 from the chamber 8, separate from the passage 9, may also be provided.

It will be noted that the construction above described permits of a gradual mixing of the fuel charge with the gas passing to the cylinder and this permits of a proper proportion of fuel to air at different loads and a proper mixture may be formed at light loads and consumed in an excess of air. The result is an engine of marked flexibility and smoothness of operation.

I desire it to be understood that this invention is not to be limited to any specific form or arrangement of parts except in so far as such limitations are specified in the claims.

What I claim as my invention is:

1. In an internal combustion engine, the combination with the cylinder space, of a precombustion chamber, a gas chamber distinct from said precombustion chamber, a mixing passage from said gas chamber to the cylinder space having a part surrounded by said precombustion chamber with small discharge openings for injecting the fuel charge from said precombustion chamber into said passage, said passage flaring outwardly toward the cylinder space from the locality of said discharge openings and being of relatively small cross-sectional area to cause rapid flow therethrough, a nozzle member provided with a discharge opening at the outlet of said passage to the cylinder space, and means for introducing fuel into said precombustion chamber.

2. In an internal combustion engine, the combination with the cylinder space, of a precombustion chamber, a gas chamber distinct from said precombustion chamber, a mixing passage from said gas chamber to the cylinder space having a part surrounded by said precombustion chamber with small discharge openings for injecting the fuel charge from said precombustion chamber into said passage, said passage flaring outwardly toward the cylinder space from the locality of said dicharge openings and being of relatively small cross-sectional area to cause rapid flow therethrough, and means for introducing fuel into said precombustion chamber.

3. In an internal combustion engine, the combination with the cylinder space, of a precombustion chamber, a gas chamber distinct from said precombustion chamber, a mixing passage from said gas chamber to the cylinder space adjacent said precombustion chamber having a part provided with small discharge openings for injecting the fuel charge from said precombustion chamber toward the outlet of said passage, said passage flaring outwardly toward the cylinder space from the locality of said discharge openings and being of relatively small cross-sectional area to cause rapid flow therethrough, and means for introducing fuel into said precombustion chamber.

4. In an internal combustion engine, the combination with the cylinder space, of a fuel-receiving and vaporizing chamber, a gas chamber, a passage with which both chambers communicate leading to said cylinder space, the communication between said gas chamber and passage being restricted to cause rapid flow of contents of the gas chamber to the combustion chamber during the working stroke, the communication between said fuel chamber and passage being restricted to inject the fuel charge into said passage, and means for introducing fuel into said vaporizing chamber.

5. In an internal combustion engine, the combination with the cylinder space, of a fuel-receiving and vaporizing chamber, a gas chamber, a mixing passage communicating with said combustion space and with both of said chambers, the communication between said passage and fuel chamber being arranged to inject the fuel charge in one or more small streams into the gas from said gas chamber passing through said passage to the combustion space, and means for introducing fuel into said vaporizing chamber.

6. In an internal combustion engine, the combination with the cylinder space, of a precombustion chamber, a gas chamber, a mixing passage communicating with said gas chamber and leading to and in constant restricted communication with said cylinder space, means for restrictively introducing the fuel charge from said precombustion chamber into said passage, and means for introducing fuel into said precombustion chamber.

7. In an internal combustion engine, the combination with the cylinder space, of a precombustion chamber, a gas chamber, a mixing passage communicating with said gas chamber and leading to said cylinder space, means for restrictively introducing the fuel charge from said precombustion chamber into the end of said passage adjacent said gas chamber to mix with the stream of gas passing therethrough, and means for introducing fuel into said precombustion chamber.

8. In an internal combustion engine, the combination with the cylinder space, a piston working therein, of a precombustion chamber, a gas chamber distinct from said precombustion chamber, a mixing passage communicating with said gas chamber and leading to said cylinder space, means including the suction effect of the piston for introducing the fuel charge from said precombustion chamber into that portion of said passage remote from said cylinder space to mix with the stream of gas passing therethrough, and means for introducing fuel into said precombustion chamber.

9. In an internal combustion engine, the combination with the cylinder space, of a precombustion chamber, a gas chamber, a mixing passage communicating with said gas chamber and leading to said cylinder space, means for restrictively introducing the fuel charge from said precombustion chamber into said passage to mix with the stream of gas passing therethrough, and means for introducing fuel into said precombustion chamber.

10. In an internal combustion engine, the combination with the cylinder space, of a precombustion chamber, a gas chamber, a mixing passage communicating with said gas chamber and flaring toward said cylinder space, means for restrictively introducing the fuel charge from said precombustion chamber into the throat portion of said passage, and means for introducing fuel into said precombustion chamber.

11. In an internal combustion engine, the combination with the cylinder space, of a precombustion chamber, a gas chamber having a hot surface portion, a mixing passage communicating with said gas chamber and leading to said cylinder space, means for restrictively introducing the fuel charge from said precombustion chamber into said passage, and means for introducing fuel into said precombustion chamber.

12. In an internal combustion engine, the combination with the cylinder space, of a precombustion chamber, a gas chamber, a mixing passage communicating with said gas chamber and leading to said cylinder space, means for restrictively introducing the fuel charge from said precombustion chamber into said mixing passage, a small passage from said precombustion chamber to the cylinder space, and means for introducing fuel into said precombustion chamber.

In testimony whereof, I affix my signature.

LOUIS O. FRENCH.